(12) United States Patent
Mahakul et al.

(10) Patent No.: US 9,228,539 B2
(45) Date of Patent: Jan. 5, 2016

(54) EXHAUST GAS RECIRCULATION MIXER

(71) Applicant: Deere & Company, Moline, IL (US)

(72) Inventors: Budhadeb Mahakul, Naperville, IL (US); Bradley L. Kasemeier, Denver, IA (US); Douglas S. Brocco, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 602 days.

(21) Appl. No.: 13/718,172

(22) Filed: Dec. 18, 2012

(65) Prior Publication Data
US 2014/0165974 A1  Jun. 19, 2014

(51) Int. Cl.
*F02M 25/07* (2006.01)
*F02M 35/10* (2006.01)

(52) U.S. Cl.
CPC ....... *F02M 25/0715* (2013.01); *F02M 25/0722* (2013.01); *Y02T 10/121* (2013.01)

(58) Field of Classification Search
USPC .............. 123/568.11, 568.12, 568.15, 568.17
See application file for complete search history.

(56) References Cited

U.S. PATENT DOCUMENTS

| | | | |
|---|---|---|---|
| 3,141,447 A | 7/1964 | Jernigan | |
| 5,611,204 A | 3/1997 | Radovanovic et al. | |
| 6,935,321 B1 | 8/2005 | Sullivan et al. | |
| 6,945,237 B1 | 9/2005 | Sullivan et al. | |
| 8,096,289 B2 * | 1/2012 | Braun | F02M 25/0703 123/568.11 |
| 2001/0027782 A1 * | 10/2001 | Bianchi | F02M 35/104 123/568.11 |
| 2004/0112345 A1 | 6/2004 | Bertilsson et al. | |
| 2004/0144372 A1 | 7/2004 | Ricart-Ugaz et al. | |
| 2009/0000297 A1 * | 1/2009 | Joergl | F02B 37/00 60/605.3 |
| 2009/0165756 A1 * | 7/2009 | Shieh | B01F 3/02 123/568.17 |
| 2012/0090581 A1 * | 4/2012 | De Almeida | F02M 25/0722 123/568.11 |
| 2013/0000617 A1 * | 1/2013 | Luft | F02M 35/10222 123/568.12 |
| 2014/0373819 A1 * | 12/2014 | Gerty | F02M 25/0722 123/568.15 |

FOREIGN PATENT DOCUMENTS

| | | |
|---|---|---|
| DE | 3324343 C1 | 8/1988 |
| DE | 102007035556 A1 | 1/2009 |
| JP | 20000045878 A | 2/2000 |
| KR | 20050097509 A | 10/2005 |
| WO | 02070888 A1 | 9/2002 |
| WO | 2009149868 A1 | 12/2009 |
| WO | 2011069566 A1 | 6/2011 |

* cited by examiner

*Primary Examiner* — Hieu T Vo
*Assistant Examiner* — Arnold Castro

(57) ABSTRACT

Disclosed is an EGR mixer for mixing a fresh air flow and an EGR flow. The EGR mixer comprises an air duct configured to allow a fresh air flow to flow therethrough, and comprises an EGR duct configured to allow an EGR flow to flow therethrough. The EGR mixer comprises a mixing duct positioned downstream of the air duct and the EGR duct. The EGR mixer comprises a supplemental duct fluidly connecting the EGR duct to a second mixing section of the mixing duct. The EGR mixer is configured to mix the fresh air flow and the EGR flow into a mixed flow.

20 Claims, 5 Drawing Sheets

EXHAUST GAS RECIRCULATION MIXER

FIELD OF THE DISCLOSURE

The present disclosure relates to an exhaust gas recirculation (EGR) mixer for an internal combustion engine.

BACKGROUND OF THE DISCLOSURE

A power system may comprise an internal combustion engine and an EGR system for recirculating a portion of the engine's exhaust flow back to an intake manifold. This portion of the exhaust flow is commonly referred to as EGR flow and is useful for reducing the concentration of oxygen available for combustion, thus lowering the combustion temperatures, slowing reactions, and decreasing nitrous oxides (NOx) formations. While, as just mentioned, EGR flow means the exhaust flow that is recirculated into the engine, fresh air flow, conversely, means the flow that is entering the power system from the atmosphere.

In some cases, the intake manifold needs to supply a precise ratio of EGR flow to fresh air flow, because too small of a ratio may cause an increase in NOx emissions, while too large of a ratio may cause an increase in soot emissions. To achieve both low NOx and soot emissions simultaneously, it is important that the ratio of the EGR flow to air flow be optimized and that also the ratio be consistent amongst all of the engine's cylinders. To do this, what is needed in the art is an EGR mixer that adequately mixes the EGR and fresh air flows.

SUMMARY OF THE DISCLOSURE

Disclosed is an EGR mixer for mixing a fresh air flow and an EGR flow. The EGR mixer comprises an air duct that comprises an air duct opening, and the air duct is configured for allowing fresh air flow to flow therethrough. Additionally, the EGR mixer comprises an EGR duct positioned adjacent to the air duct, wherein the EGR duct, configured for allowing the EGR flow to flow therethrough, comprises an EGR duct opening. Further yet, the EGR mixer comprises a mixing duct positioned downstream of the air duct and also downstream of the EGR duct. The mixing duct, which is configured to mix the fresh air flow and the EGR flow into a mixed flow, comprises a first mixing section and a second mixing section. The air duct opening and EGR duct opening both open into the first mixing section, and positioned downstream of the first mixing section is the second mixing section.

Still further, the EGR mixer comprises a supplemental duct, and the supplemental duct, more specifically, comprises inlet and outlet openings. The supplemental duct is positioned so that it fluidly connects the EGR duct to the second mixing section. The inlet opening of the supplemental duct is positioned upstream of the first mixing section, while in contrast, the outlet opening of the supplemental duct is positioned downstream of the first mixing section.

The disclosed EGR mixer effectively and consistently mixes the EGR and fresh air flows and may achieve a maximum variation of just +/−5% flow from the mean EGR flow for each respective cylinder. This means that for an operating condition with an average composition of 20% EGR flow (i.e., where 20% of the mixed flow is EGR flow), the EGR flow in all cylinders would be between 19% and 21%. By so effectively mixing the flows, the amount of EGR flow may be reduced. The result may be reduced engine pumping, increased fuel economy, and/or easier compliance with emissions regulations.

BRIEF DESCRIPTION OF THE DRAWINGS

The detailed description of the drawings refers to the accompanying figures in which.

DETAILED DESCRIPTION OF THE DRAWINGS

Figure 1:
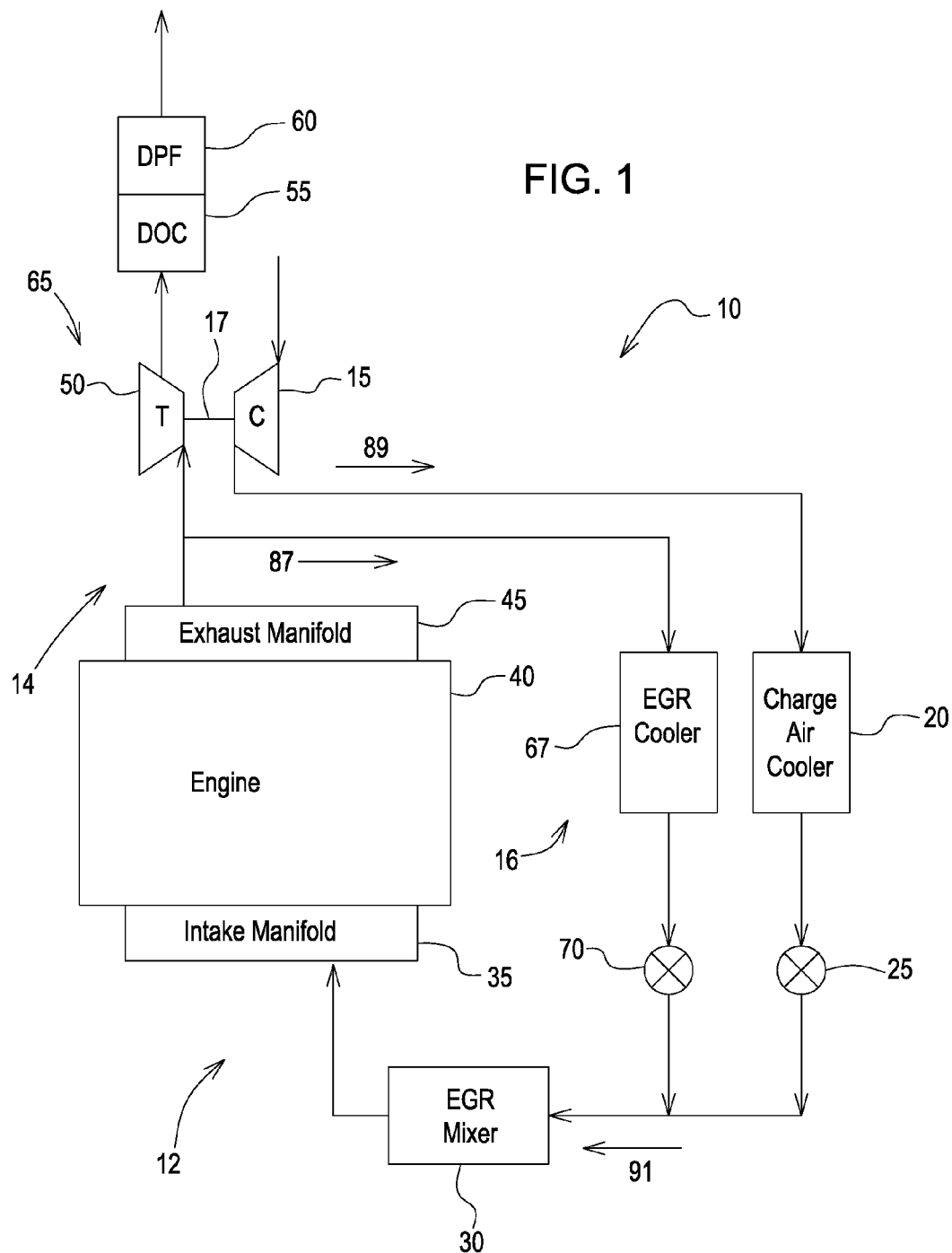
FIG. 1. is a schematic illustration of a power system comprising an EGR mixer.
Figure 2:
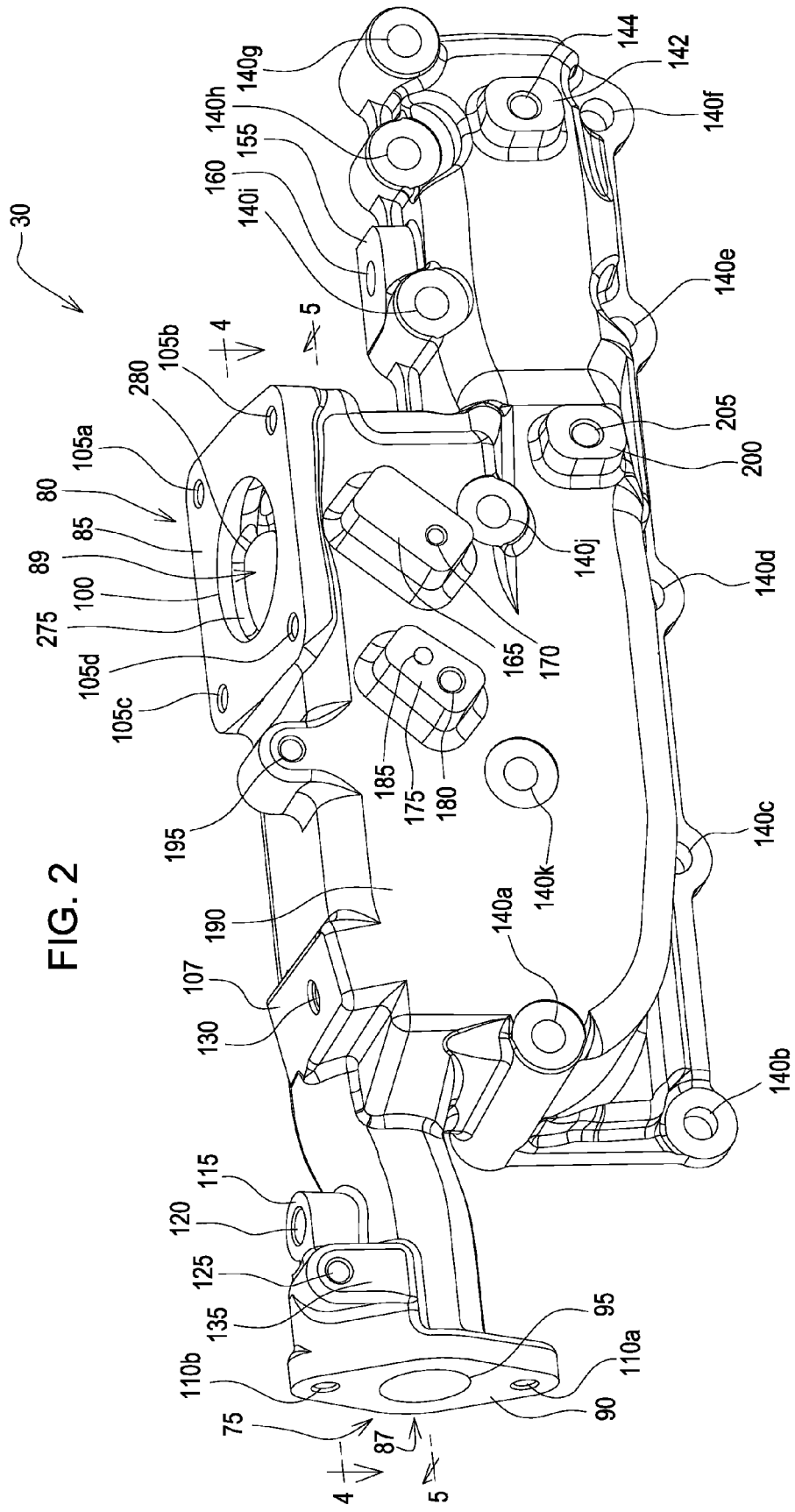
FIG. 2. is a perspective view of a front side of the EGR mixer.
Figure 3:
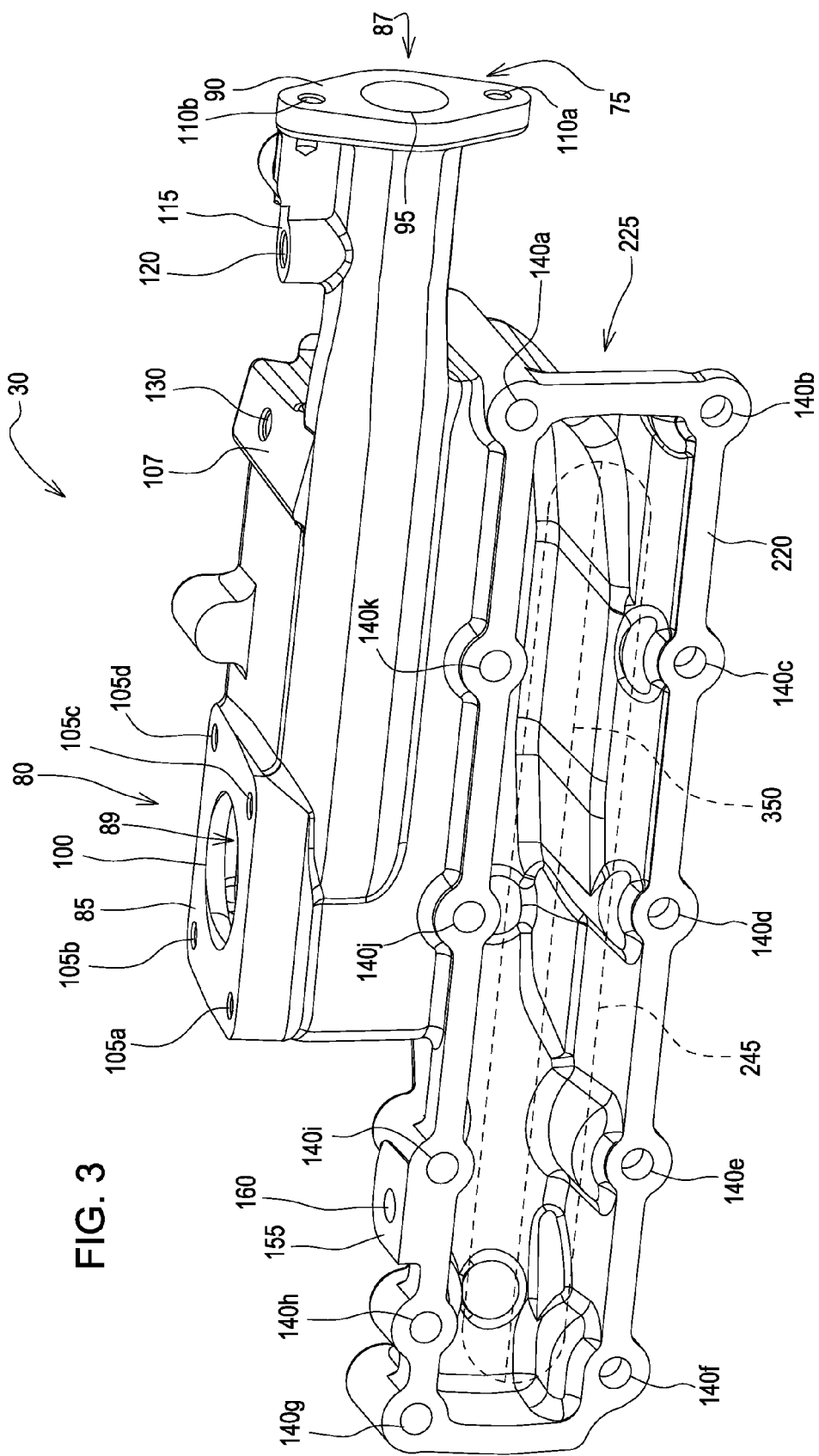
FIG. 3. is a perspective view of a back side of the EGR mixer.

Referring to FIG. 1, there is shown a schematic illustration of a power system 10 comprising an engine 40, such as a diesel engine or a gasoline engine, and an EGR mixer 30. The power system 10 may be use for providing power to a variety of machines, including on-highway trucks, construction vehicles, marine vessels, stationary generators, automobiles, agricultural vehicles, and recreation vehicles. An intake system 12, which includes an intake manifold 35, is used for delivering a combination of EGR and fresh air flows 87, 89 (i.e., mixed flow 91) to the engine 40, and an exhaust system 14 is used for allowing the exhaust flow to exit the power system 10, with the exception of the EGR flow 87 that is ultimately rerouted to the intake manifold 35. As shown, the EGR flow 87 that is rerouted to the intake manifold 35 may be cooled in an EGR cooler 67. In the illustrated embodiment, the intake system 12 comprises a charge air cooler 20 for cooling the fresh air flow 89 after a compressor 15 compresses it. An intake throttle valve 25 may be provided, in the power system 10, for controlling the rate of fresh air flow 89 that enters the engine 40, and it may be either manually or electrically operated, for example.

As illustrated, the power system 10 comprises a turbocharger 65, which may be viewed, more specifically, as the combination of a shaft 17 connecting a turbine 50 and the compressor 15. In other embodiments, the power system 10 may comprise, for example, a dual turbocharger arrangement. Exemplarily, the turbocharger 65 may be a variable geometry turbocharger, a fixed geometry turbocharger, or a wastegate turbocharger.

In the illustrated embodiment, the exhaust system 14 includes an exhaust manifold 45 for delivering a portion of the exhaust flow to a diesel oxidation catalyst (DOC) 55 and then a diesel particulate filter (DPF) 60. The DOC 55 may be used for oxidizing hydrocarbons and carbon monoxide present in the exhaust flow, and also for capturing particulates present in the exhaust flow, such as carbon, oil particulates, and ash. The DPF 60 may be regenerated by burning or oxidizing the captured particulates if the temperatures of the DPF 60 or exhaust flow flowing therethrough are sufficiently high.

Also provided, in the power system 10, is an exhaust gas recirculation (EGR) system 16 comprising an EGR valve 70 that is configured to selectively reroute a metered portion of the EGR flow 87 to the engine 40. In other embodiments of the power system 10, the exhaust system 14 may also include a selective catalytic reduction system (not shown) for reducing NOx levels beyond what the EGR system 16 can achieve acting alone.

Referring to FIGS. 2-5, the EGR mixer 30 is shown in detail. The EGR mixer 30 comprises an air duct 80 for allowing the fresh air flow 89 to travel therethrough, and the EGR mixer 30 comprises an EGR duct 75 positioned adjacent to the air duct 80. The EGR duct 75, which comprises an EGR duct opening 250, is configured to allow the EGR flow 87 to travel therethrough. As stated above, the EGR mixer 30 is configured to mix the fresh air flow 89 and the EGR flow 87 into a mixed flow 91.

Figure 4:
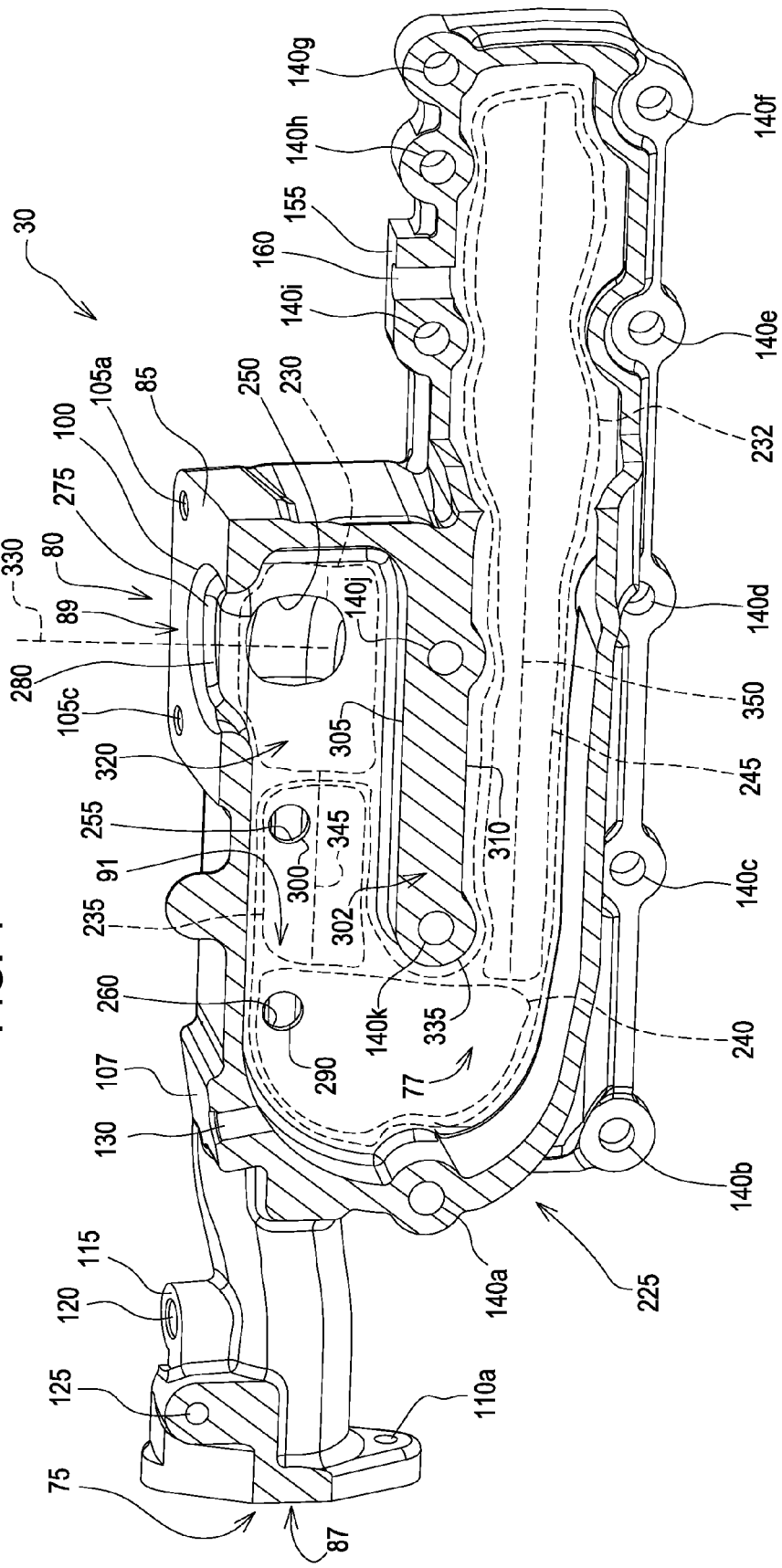
FIG. 4. is a perspective view of the EGR mixer taken along lines 4-4 of FIG. 2.

As shown in FIG. 4, for example, the EGR mixer 30 comprises a mixing duct 225 positioned downstream of the air duct 80 and also downstream of the EGR duct 75. The mixing duct 225 comprises a first mixing section 230, and positioned downstream thereof is second mixing section 232. The EGR mixer 30 also comprises an air duct opening 280 that, along with the EGR duct opening 250, opens into the first mixing section 230.

The EGR flow 87 travels in pulses correlating to the exhaust strokes of the cylinders (not shown) of the engine 40. So, if the engine 40 has, for example, four cylinders, then the EGR flow 87 travels in one pulse per every 180° of crank rotation. The fresh air flow 89 also travels in pulses, but these pulses correlate to, for example, the operation of the turbocharger 65 and intake valves (not shown), resulting in the pulses of the fresh air flow 89 traveling at unique times and frequencies relative to the pulses of the EGR flow 87. As a result of all of this, the EGR and fresh air flows 87, 89 mix turbulently in the first mixing section 230.

As shown in FIG. 4, for example, the EGR mixer 30 comprises a supplemental duct 255 fluidly connecting the EGR duct 75 to the second mixing section 232. More specifically, the supplemental duct 255 comprises an inlet opening 295 and an outlet opening 300, the inlet opening 295 being positioned upstream of the first mixing section 230 and, in contrast, the outlet opening 300 being positioned downstream of the first mixing section 230. The air duct 80 may comprise a shoulder 275 formed into the air duct opening 280, the shoulder 275 being configured to advance the air, from the air duct 80, into the first mixing section 230, rather than into the EGR duct 75.

Figure 5:
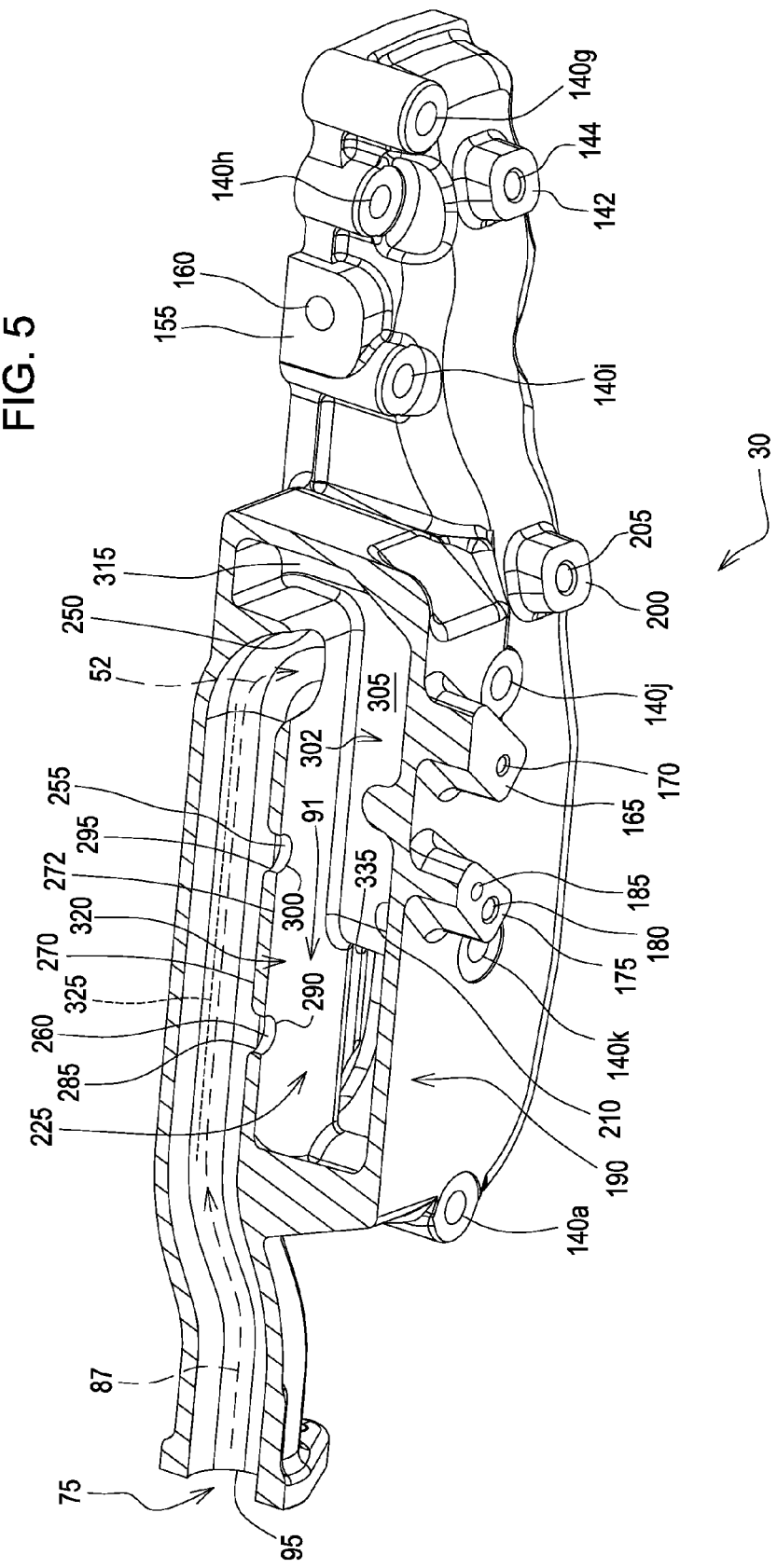
FIG. 5 is a perspective view of the EGR mixer taken along lines 5-5 of FIG. 2.

As shown in FIG. 5, the EGR duct 75 may comprise an EGR duct bend 52 and the EGR duct opening 250 that is contiguous thereto and that opens into the first mixing section 230. As further shown, in the illustrated embodiment, the ducts—the air duct 80, the EGR duct 75, and the mixing duct 225—may be formed together into a single casting, and additionally the mixing duct 225 may be approximately "J"-shaped, although it could take many other shapes as well. As shown in FIG. 5, the EGR mixer 30 may also comprise a cavity 315 that is contiguous with the first mixing section 230 for, for example, improving the mixing properties of the EGR mixer 30.

The second mixing section 232 may comprise first, second, and third segments 235, 240, 245. The second segment 240 is downstream of the first segment 235, and the third segment 245 is downstream of the second segment 240. Exemplarily, as shown in FIG. 4, the second segment 240 may be a bend 77, in the form of, for example, an approximately 180° angle, for enhancing the mixing of the EGR and fresh air flows 87, 89 (i.e., the mixed flow 91). At the bend 77, a transverse pressure gradient may develop and provide centripetal forces to the mixed flow 91. The transverse pressure gradient required for the faster moving portion of the mixed flow 91 to follow the bend 77, near a first wall 302, is greater than that of the slower moving portion of the mixed flow 91 that is far away. This results in the mixed flow 91 near the first wall 302 moving outwards, and the mixed flow 91 that is far away moving inwards, thus further redistributing the mixed flow 91.

As shown in the combination of FIGS. 4 and 5, a longitudinal axis 330 of the air duct 80 and a longitudinal axis 325 of the EGR duct 75 may be substantially perpendicular to one another. As further shown, a longitudinal axis 345 of the first segment 235 of the second mixing section 232 may be substantially parallel to the longitudinal axis 350 of the third segment 245 of the second mixing section 232. As further shown in the combination of FIGS. 4 and 5, the longitudinal axis 325 of the EGR duct 75 may be substantially parallel to the longitudinal axes 345, 350, though in other embodiments, the longitudinal axes 325, 330, 345, 350 may be oriented differently relative to one another.

As shown, in the illustrated embodiment, the supplemental duct 255 may fluidly connect the EGR duct 75 to the first segment 235, but in other embodiments, the supplemental duct 255 may fluidly connect the EGR duct 75 to, for example, the second segment 240. The EGR mixer 30 may also comprise a second supplemental duct 260 that fluidly connects the EGR duct 75 to the second mixing section 232. In such embodiments, the supplemental duct 255 is a first supplemental duct 255. As shown in FIG. 5, the second supplemental duct 260 may comprise an inlet opening 285 and an outlet opening 290. As further shown in FIG. 5, the inlet opening 285 is upstream of the inlet opening 295, and the outlet opening 290 is downstream of the outlet opening 300.

The second supplemental duct 260 may fluidly connect the EGR duct 75 to the first segment 235, or as shown in the illustrated embodiment, the second supplemental duct 260 may fluidly connect the EGR duct 75 to, for example, the second segment 240.

The first and second supplemental ducts 255, 260 allow a portion of the EGR flow 87 to enter the mixing duct 225 in the second mixing section 232, rather than in the first mixing section 230. The first and second supplemental ducts 255, 260 provide a cross stream of a portion of the EGR flow 87 to the mixed flow 91, resulting in turbulent mixing of the two. Moreover, the cross stream may also impact the mixing duct 225, thus even further increasing the amount of turbulent mixing that occurs therein.

As shown in the combination of FIGS. 4 and 5, the first wall 302 is positioned between the first segment 235 and the third segment 245. As further shown, the first segment 235 may overlap a first side 305 of the first wall 302, the second segment 240 may overlap an end 335 of the first wall 302, and the third segment 245 may overlap a second side 310 of the first wall 302. The first side 305 may be on the opposite side of the second side 310.

Exemplarily, the EGR mixer 30 may comprise a second wall 320 positioned between the EGR duct 75 and the combination of the first and second mixing sections 230, 232. As shown in FIG. 5, for example, the EGR duct 75 may overlap a first side 270 of the second wall 320, while the combination of the first and second mixing sections 230, 232 may overlap a second side 272. Further, the first and second sides 270, 272 may be on opposite sides of the second wall 320. As shown, the first wall 302 may be formed into and substantially perpendicular to the second wall 320. As further shown, the first side 305 of the first wall 302 and the second side 272 of the second wall 320 may form an edge.

Further yet, the EGR mixer 30 may also comprise a third wall 190, and the first wall 302 may be formed therein. The first wall 302 may be positioned between the second wall 320 and the third wall 190, and may be substantially perpendicular to the third wall 190. The first side 305 of the first wall 302 and a first side 210 of the third wall 190 may form a second edge, and likewise the second side 310 of the first wall 302 and the first side 210 of the third wall 190 may form a third edge. The second wall 320 and the third wall 190 may be substantially parallel. The third wall 190 forms a side of the first, second, and third segments 235, 240, 245.

Referring back to FIG. 2, the EGR mixer 30 may comprise an EGR inlet mounting face 90, which may comprise apertures 110*a*, 110*b* and an EGR mounting face opening 95. As illustrated, the EGR mixer 30 may also comprise an air inlet mounting face 85, and the air inlet mounting face 85 may, more specifically, comprise apertures 105*a-d* and an air mounting face opening 100. Further yet, The EGR mixer 30 may comprise an EGR mixer mounting face 220, wherein the EGR mixer mounting face 220 comprises apertures 140*a-k*.

In the embodiment shown, the EGR mixer 30 may additionally comprise a mount 142 comprising an aperture 144; a mount 155 comprising an aperture 160; a mount 115 comprising an aperture 120; a mount 135 comprising an aperture 125; a mount 165 comprising an aperture 170; a mount 175 that comprises an aperture 180 and an aperture 185; a mount 107 comprising an aperture 130; and, finally, a mount 200 comprising an aperture 205. Further, the EGR mixer 30 may also comprise an aperture 195.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An exhaust gas recirculation (EGR) mixer configured to mix a fresh air flow and an EGR flow, the EGR mixer comprising:
    an air duct configured to allow the fresh air flow to flow therethrough, the air duct comprising an air duct opening;
    an EGR duct positioned adjacent to the air duct, the EGR duct is configured to allow the EGR flow to flow therethrough, the EGR duct comprising an EGR duct opening;
    a mixing duct positioned downstream of the air duct and also being positioned downstream of the EGR duct, the mixing duct comprising a first mixing section and a second mixing section, the air duct opening and the EGR duct opening both opening into the first mixing section, the mixing duct configured to mix the fresh air flow and the EGR flow into a mixed flow, the second mixing section being positioned downstream of the first mixing section; and
    a supplemental duct fluidly connecting the EGR duct to the second mixing section, the supplemental duct comprising an inlet opening and an outlet opening, the inlet opening of the supplemental duct being positioned upstream of the first mixing section, and the outlet opening of the supplemental duct being positioned downstream of the first mixing section.

2. The EGR mixer of claim 1, wherein the air duct comprises a shoulder, the shoulder is formed into the air duct opening, and the shoulder is configured to advance the fresh air flow, from the air duct, into the first mixing section rather than into the EGR duct.

3. The EGR mixer of claim 1, wherein the EGR duct comprises an EGR duct bend and an EGR duct opening, the EGR duct opening opens into the first mixing section, and the EGR duct bend is contiguous with the EGR duct opening.

4. The EGR mixer of claim 1, wherein the air duct and the EGR duct and the mixing duct are formed together as a single casting.

5. The EGR mixer of claim 1, comprising a cavity contiguous with and upstream of the first mixing section.

6. The EGR mixer of claim 1, wherein the mixing duct is approximately "J"-shaped.

7. The EGR mixer of claim 1, wherein a longitudinal axis of the air duct and a longitudinal axis of the EGR duct are substantially perpendicular to one another.

8. The EGR mixer of claim 1, wherein the second mixing section comprises a first segment and a second segment and a third segment, the second segment is downstream of the first segment, the third segment is downstream of the second segment, and the second segment is a bend.

9. The EGR mixer of claim 8, wherein the bend forms an approximately 180° angle.

10. The EGR mixer of claim 8, wherein a longitudinal axis of the first segment of the second mixing section is substantially parallel to a longitudinal axis of the third segment of the second mixing section.

11. The EGR mixer of claim 10, wherein a longitudinal axis of the EGR duct is substantially parallel to the longitudinal axis of the first segment of the second mixing section and also the longitudinal axis of the third segment of the second mixing section.

12. The EGR mixer of claim 10, wherein the supplemental duct fluidly connects the EGR duct to the first segment of the second mixing section.

13. The EGR mixer of claim 10, wherein the supplemental duct fluidly connects the EGR duct to the second segment of the second mixing section.

14. The EGR mixer of claim 8, comprising a second supplemental duct fluidly connecting the EGR duct to the second mixing section, the supplemental duct being a first supplemental duct, the second supplemental duct comprising an inlet opening and an outlet opening, the inlet opening of the second supplemental duct being positioned upstream of the inlet opening of the first supplemental duct, the outlet opening of the second supplemental duct being positioned downstream of the outlet opening the first supplemental duct.

15. The EGR mixer of claim 14, wherein the second supplemental duct fluidly connects the EGR duct to the first segment.

16. The EGR mixer of claim 14, wherein the second supplemental duct fluidly connects the EGR duct to the second segment.

17. The EGR mixer of claim 8, comprising a first wall positioned between the first segment and the third segment, the first segment overlapping a first side of the first wall, the second segment overlapping an end of the first wall, the third segment overlapping a second side of the first wall, and the first side of the first wall and the second side of the first wall being on opposite sides of the first wall.

18. The EGR mixer of claim 17, comprising a second wall positioned between the EGR duct and the combination of the first mixing section and the second mixing section, the EGR duct overlapping a first side of the second wall, the combination of the first mixing section and the second mixing section overlapping a second side of the second wall, and the first side of the second wall and the second side of the second wall being on opposite sides of the second wall.

19. The EGR mixer of claim 18, wherein the first wall formed into the second wall, the first wall is substantially perpendicular to the second wall, and the first side of the first wall and the second side of the second wall form an edge.

20. The EGR mixer of claim 19, comprising a third wall, the first wall being formed into the third wall, the first wall being positioned between the second wall and the third wall, the first wall being substantially perpendicular to the third wall, the first side of the first wall and a first side of the third wall forming a second edge, the second side of the first wall and a first side of the third wall forming a third edge, the second wall and the third wall being substantially parallel relative to one another, and the third wall forming a side of the first segment, the second segment, and the third segment.

* * * * *